April 9, 1968  H. FARBER  3,376,986
DETACHABLE GARBAGE CAN CARRIER
Filed May 12, 1966
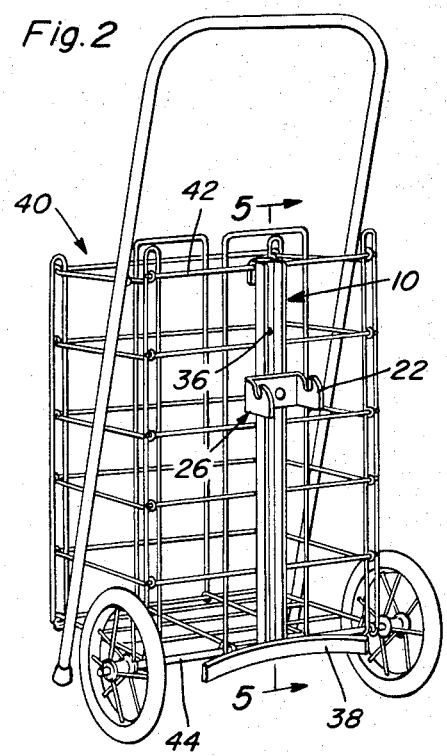
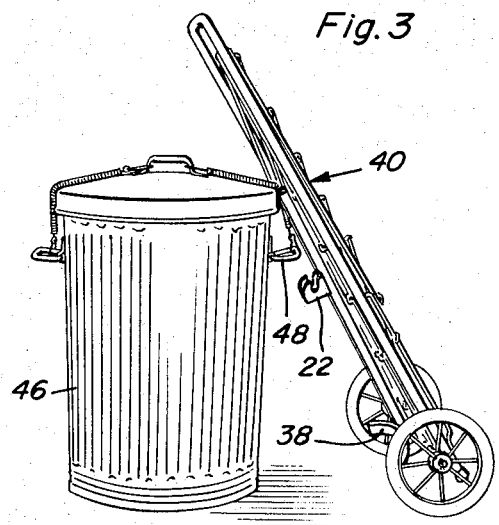
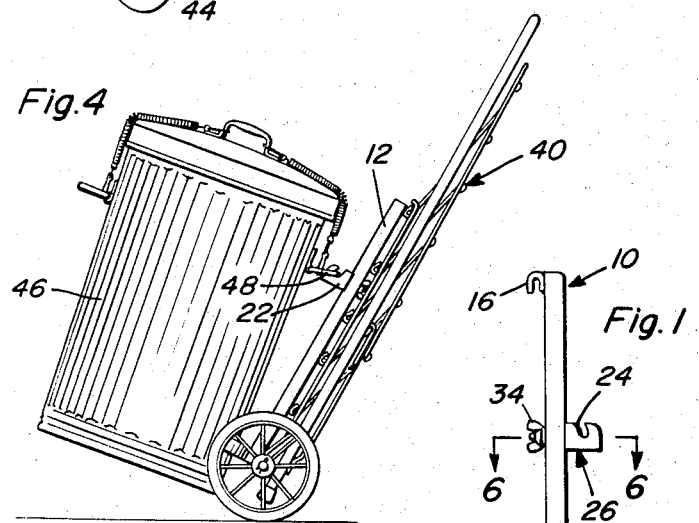
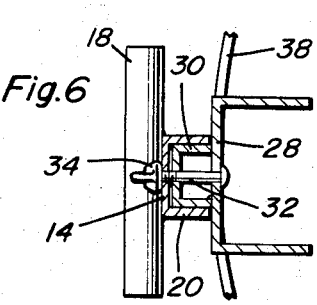
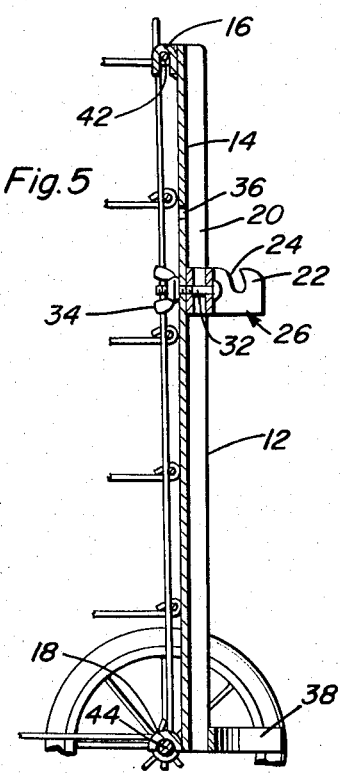
Henry Farber
INVENTOR.

United States Patent Office 3,376,986
Patented Apr. 9, 1968

3,376,986
DETACHABLE GARBAGE CAN CARRIER
Henry Farber, 69—28 226th St.,
Bayside, N.Y. 11364
Filed May 12, 1966, Ser. No. 549,713
5 Claims. (Cl. 214—372)

ABSTRACT OF THE DISCLOSURE

A carrier for garbage cans or the like in the nature of an attachment removably mountable upon a wheeled cart for use of the cart as a transporter for a can engaged by the carrier. The carrier includes mounting hooks engageable with the cart, lifting hook means engageable with the handle of a container, and an arcuate stabilizing member within which the container is nested.

The instant invention is concerned with means for conveying large containers such as garbage cans or the like, and more particularly relates to a device which is mountable on a wheeled vehicle and capable of being manipulated so as to effect a positive grasping and raising of the can without a physical touching of the can by the user.

It is a primary object of the instant invention to provide a carrier which is of a relativley simple though highly unique construction adapted for engagement with any suitable rack-like frame preferably incorporating conveying wheels, such as for example a conventional folding shopping cart, for the utilization of the cart as a means for transporting a garbage can.

In conjunction with the above object, it is also a significant object of the instant invention to provide a portable can carrier which is of a highly rigid construction capable of firmly grasping and stabilizing a can during the transporting thereof.

Further, it is a significant object of the instant invention to provide a carrier which through a simple upward and rearward swinging thereof is capable of lockingly engaging a garbage can handle and raising the garbage can off of the ground for the transporting thereof, while at the same time firmly and stably receiving the lower end of the can so as to prevent any movement of the can relative to the carrier.

In achieving these objects, it is contemplated that the carrier of the instant invention include a vertically elongated rigid member incorporating two rearwardly projecting downwardly directed hooks engageable over vertically spaced horizontal bars of a conveying vehicle. In addition, the carrier is provided with a pair of aligned laterally spaced upwardly directed handle receiving hooks at a height well above the bottom thereof for engagement with a garbage can handle, and a forwardly directed arcuate rigid strap within which the lower portion of a garbage can nests as it is raised from the ground and swung rearwardly onto the carrier.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the container or garbage can carrier of the instant invention;

FIGURE 2 is a perspective view of the carrier of the instant invention mounted upon a suitable conveying rack, in this instance a folding shopping cart, unfolded in this particular view so as to illustrate the manner in which the carrier is engaged therewith;

FIGURE 3 illustrates the first step in engaging the carrier with a garbage can solely through a manipulation of the conveying vehicle;

FIGURE 4 illustrates the second step in raising the garbage can completely from the ground for a conveying thereof;

FIGURE 5 is a partial vertical cross-sectional view, taken substantially on a plane passing along line 5—5 in FIGURE 2, illustrating the manner in which the carrier is engaged with the upper and lower bars or rods of the rack portion of the shopping cart; and FIGURE 6 is an enlarged transverse cross-sectional view taken substantially on a plane passing along line 6—6 in FIGURE 1 illustrating the manner in which the lifting hooks are fixed to the body of the carrier.

Referring now more specifically to the drawings, reference numeral 10 is used to generally designate the carrier comprising the instant invention. The carrier 10 includes a rigid elongated bar-like member 12, this member 12 preferably being channel-shaped so as to achieve a substantial degree of rigidity and structural strength with a minimum amount of weight.

Fixed to the rear face of the bar 12, this rear face being defined by the bight portion 14 of the channel, is a pair of rearwardly projecting downwardly directed mounting members or hooks 16 and 18. These mounting hooks 16 and 18 are to be transversely elongated with the upper hook 16, positioned at the extreme upper end of the bar 12, being of a width equal to the width of the bar, and with the lower mounting hook 18, secured to the extreme lower end of the bar 12, being of a width substantially greater than that of the bar 12, both hooks thereby contributing significantly to the stability of the carrier 10 upon a mounting thereof in a manner which shall be described presently.

Fixed to the forward face of the bar 12, defined by the forward edges of the channel legs 20, is a pair of forwardly projecting upwardly directed lifting hooks 22. These hooks 22 are defined by upwardly opening recesses 24 provided within a pair of laterally spaced forwardly projecting plate-like members 26 interconnected by a transverse backing plate 28 which is engaged and clamped against the spaced forward edges of the channel bar legs 20. This clamping of the lifting hooks unit is effected by the provision of a lug 30 welded vertically across the rear face of the plate 28 and snugly receivable within the channel bar 12 between the legs 20 thereof, and an elongated mounting bolt 32 engaged through the backing plate 28, mounting lug 30 and bight portion 14 for releasable locking engagement with nut means 34 in a manner so as to fixedly clamp the lifting hook unit in position. In order to provide for a vertical adjustment of the lifting hook element on the bar 12, it will be noted that more than one aperture 36 can be provided along the upper portion of the bight 14 of the channel bar 12 for the accommodation of the mounting bolt 32 in a vertically adjusted position.

Finally, the lower end of the carrier 10 is provided with a forwardly curving arcuate rigid stabilizing strap 38 fixedly secured, as by welding, to the lower end of the channel bar 12.

In actual use, the carrier 10 can be mounted upon any suitable conveying means which includes a rack-like body having at least two horizontally directed rigid rods for engagement by the mounting hooks 16 and 18, such conveying means preferably being wheel mounted. One specific example of such a conveying means or vehicle is a conventional folding shopping cart as illustrated in the drawings. This cart, generally designated by reference numeral 40, includes a rear frame having upper and lower rigid horizontal rods 42 and 44 upon which the upper and lower hooks 16 and 18 can firmly engage through an inward and downward movement of the carrier 10. The substantial width of both of the hooks 16 and 18, in conjunction with the relatively great depth of at least the upper hook portion 16, ensure a stable and positive engagement of the carrier 10 with the conveying vehicle.

In using the assembled carrier 10 and cart 40 for raising and moving a container, such as the illustrated garbage can 46, the cart 40, normally in its collapsed or folded position for ease of manipulation, is angled rearwardly so as to position the lifting hooks 22 below one of the garbage can handles 48, noting in particular FIGURE 3. Next, the vehicle is moved toward the can and swung upwardly so as to engage the adjoining can handle 48 by the pair of laterally spaced lifting hooks 22, the notches 24 defining the hooks being slightly inwardly slanted so as to ensure a positive retaining grip on the handle 48. After initially engaging the handle 48 with the laterally spaced hooks 22, the spacing of which ensures a degree of stability in the grasp of the container, the pivotal movement of the vehicle is continued, noting FIGURE 4, so as to effect a raising of the container and a movement of the lower end of the container 46 into the rigid arcuate stabilizing strap 38 which assists the lifting hooks 22 in preventing any lateral swaying or movement of the can. The can, having been completely lifted from the ground and mounted on a wheeled vehicle without direct engagement of the can by the user of the device, is now mounted and ready for transport. Once the destination is reached, one need merely pivot the conveying vehicle 40 forwardly so as to lower the can 46 to the ground and disengage the lifting hooks.

As indicated supra, in order to accommodate cans 46 of different heights, the lifting hook unit can be vertically adjusted along the vertical bar 12 of the carrier 10, and in order to effect this, one or more additional mounting holes 36 can be provided therealong. Further, while the lifting hook unit is to be adjustable, when clamped in position it constitutes, through the mounting lug 30 which may be in the nature of a small channel bar having the longitudinal edges of the legs thereof welded to the rear face of the bight portion 28, a highly rigid portion of the carrier 10 with movement thereof relative to the carrier bar 12 being completely precluded.

From the foregoing, it should be appreciated that a unique garbage can carrier has been defined, this carrier being portable in nature and adapted, in combination with a conveying vehicle such as a conventional shopping cart, for lifting and transporting a loaded garbage can solely through a manipulation of the conveying vehicle itself. As such, all of the difficulties heretofore associated with the movement of loaded garbage cans has been substantially eliminated in that only a minimum amount of physical strength or effort will be required with the user of the device at no time being required to physically grasp and raise the can itself.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A container carrier comprising an elongated rigid member, said member having a forward face, a rear face and upper and lower ends, mounting means fixed to said rear face, said mounting means projecting rearwardly from said member for locking engagement with a conveying vehicle, lifting means fixed to the forward face of said member in upwardly spaced relation to the lower end thereof, said lifting means projecting forwardly from said member for releasable locking engagement with a portion of a container at a point above the lower end of the container for a suspension of the container therefrom, and container stabilizing means fixed to the forward face of the member in spaced relation below the lifting means, said stabilizing means projecting forwardly from said member so as to define a receiving seat for the lower end of said container, said lifting means comprising a pair of laterally spaced upwardly directed lifting hooks engageable beneath laterally spaced portions of an outwardly directed section of a container, said rigid member comprising a channel bar, a mounting plate interconnecting said lifting hooks, said mounting plate having a rearwardly directed positioning lug thereon received snugly within said channel bar, and bolt means engaged through said mounting plate, lug and channel bar for clamping said mounting plate, and thereby the lifting hooks, to said channel bar.

2. The carrier of claim 1 wherein said mounting means comprises a pair of downwardly directed mounting hooks positioned at the opposite end portions of said rigid member for engagement with vertically spaced portions of a conveying vehicle.

3. The carrier of claim 2 wherein said stabilizing means comprises a forwardly directed arcuately formed strap member.

4. A container carrier comprising an elongated rigid member, said member having a forward face, a rear face and upper and lower ends, mounting means fixed to said rear face, said mounting means projecting rearwardly from said member for locking engagement with a conveying vehicle, lifting means fixed to the forward face of said member in upwardly spaced relation to the lower end thereof, said lifting means projecting forwardly from said member for releasable locking engagement with a portion of a container at a point above the lower end of the container for a suspension of the container therefrom, and container stabilizing means fixed to the forward face of the member in spaced relation below the lifting means, said stabilizing means projecting forwardly from said member so as to define a receiving seat for the lower end of said container, said lifting means comprising a pair of laterally spaced upwardly directed lifting hooks engageable beneath laterally spaced portions of an outwardly directed section of a container, at least a portion of said rigid member being of a channel-shaped configuration, a mounting plate interconnecting said lifting hooks, said mounting plate having a rearwardly directed positioning lug thereon received snugly within the channel-shaped portion, and bolt means engaged through said mounting plate, lug and channel-shaped portion for clamping said mounting plate, and thereby the lifting hooks, to said rigid member.

5. A container carrier removably mountable upon an independently usable conventional wheeled vehicle, said carrier comprising an elongated rigid linear member, said member having a forward face, a rear face and upper and lower ends, mounting means fixed to said rear face, said mounting means comprising a pair of downwardly directed mounting hooks positioned at the opposed end portions of said rigid member for engagement with vertically spaced portions of said conveying vehicle, lifting means fixed to the forward face of said member in upwardly spaced relation to the lower end thereof, said lifting means comprising at least one upwardly directed hook projecting forwardly from said member for releasable locking engagement with a portion of a container at a point above the lower end of the container for a suspension of the container therefrom, and container stabilizing means fixed to the forward face of the member in spaced relation below the lifting means, said stabilizing means comprising a forwardly directed arcuately formed piece defining a receiving seat for the lower end of the hook suspended container.

References Cited

UNITED STATES PATENTS

| | | | |
|---|---|---|---|
| 647,629 | 4/1900 | Knowles | 280—47.27 |
| 2,472,670 | 6/1949 | McFarland | 214—384 |
| 2,719,640 | 10/1955 | Copas et al. | 214—372 |
| 2,763,388 | 9/1956 | Olsson | 214—384 |

FOREIGN PATENTS 923,159  4/1963  Great Britain.

BENJAMIN HERSH, *Primary Examiner.*

J. A. PEKAR, *Assistant Examiner.*